United States Patent [19]
Kanai

[11] 4,429,331
[45] Jan. 31, 1984

[54] VIDEO CIPHER PROCESSING SYSTEM

[75] Inventor: Ryokichi Kanai, Toda, Japan

[73] Assignee: Clarion Co., Ltd., Tokyo, Japan

[21] Appl. No.: 287,313

[22] Filed: Jul. 27, 1981

[30] Foreign Application Priority Data

Jul. 29, 1980 [JP] Japan .................. 55-103146

[51] Int. Cl.³ .................. H04N 7/16; H04K 1/04
[52] U.S. Cl. .................. 358/124; 358/123
[58] Field of Search .................. 358/123, 124

[56] References Cited

U.S. PATENT DOCUMENTS 4,308,556 12/1981 Osaka .................. 358/124
4,340,906 7/1982 Toonder et al. .................. 358/124

FOREIGN PATENT DOCUMENTS 841627 7/1960 United Kingdom .................. 358/124

Primary Examiner—S. C. Buczinski
Attorney, Agent, or Firm—Russell E. Hattis; Stephen R. Arnold

[57] ABSTRACT

A video cipher processing system comprising a detecting means for detecting average tone variation of TV video signals, an extracting means for extracting at random at least some of outputs from the detecting means as a result of the detection and a ciphering means for ciphering video signals by inverting or non-inverting polarities of video signals in response to outputs extracted at random by the extracting means.

4 Claims, 11 Drawing Figures

VIDEO CIPHER PROCESSING SYSTEM

BACKGROUND OF THE INVENTION

1. Field of the Invention

This invention relates to a video cipher processing system for use in TV broadcasting, and more particularly to improvements in a system for use in a pay TV wireless broadcasting in which a broadcasting system station transmits ciphered TV signals obtained by inverting video signals by means of an encoder. The ciphered TV signals are decoded by a subscriber's decoder to be reproduced in the TV receiver.

A wireless pay TV system has been adopted and developed in response to a public desire for better programs, even if for a fee, because general commercial broadcasting programs are filled with advertisements and are held by some to contain vulgar contents due to various social are economical restrictions.

Such a system is expected to be more useful in the future because it would have the advantage that the time and expense which is required for spreading cables can be saved by a wireless system and that the number of subscribers per system is not subject to any restriction.

Generally in such wireless pay TV systems, video signals and voice ignals are ciphered so as to be available to subscribers only, excluding others. A conventional example of those systems is shown in FIG. 1. Video signals at the transmitter applied to an encoder input terminal 1 are subjected to controlled polarity inversion by a video signal polarity inverter 3 to be sent therefrom to an output terminal 2. At this time, the video signal polarity inverter 3 is controlled by a random number signal generator 4. That is, the video signal polarity inverter 3 produces an output but selectively inverting the polarity of the applied video signals in response to a logical value signal from the random number signal generator 4, which value varies at random. A decoder is arranged to decode the ciphered video signals in accordance with a previously prepared key code signal so as, to reproduce a visible picture so that only a subscriber having such a decoder can look at and listen to the program.

However, in such a conventional ciphering system for the picture signals, there have occurred discrepancies between the original video signals and the reproduced video signals, due to the differences between the characteristics (linearity, for example) of the parts used in the encoder and the decoder, respectively, so as to cause flickers in the screen arising from irregular luminance and hue variation. Such drawbacks might be eliminated by making the parts used in the encoder and the decoder have more controllably the same characteristics, or by keeping a precise adjustment and maintenance thereof.

However, such means are not preferable from a manufacturing and economical point of view.

In order to reduce such occurrence of flickers, there has been proposed another system for processing ciphers in which by detecting the average tone variation of the video signals they are submitted to polarity inversion only upon occurrence of significant average tone variation i.e. when the brightness of the screen varies due to change of scenes.

However, video signals ciphered and transmitted by the above-mentioned system also have the possibility of being reproduced by detecting the average tone variation thereof without decoding ciphers by means of a decoder, and thus, there has arisen the problem that the deciphering manner cannot be kept secret.

OBJECT OF THE INVENTION

It is therefore an object of the present invention to provide a video cipher processing system capable of reducing the influence on the screen caused by flickers, as well as keeping the secrecy of ciphering operation, by carrying out polarity inversion only upon variation of the average tone of the video signals and by extracting at random some of the incidences of such average tone variations instead of carrying out polarity inversion at random irrespective of the state of the screen.

SUMMARY OF THE INVENTION

In accordance with the present invention, there is provided a video cipher processing system which comprises:
- an average tone variation detecting means for detecting average tone variation of TV video signals;
- an extracting means for extracting at random at least some of the output signal from said detecting means as a result of the detection; and
- an inverting means for inverting polarities of said signals in response to, said at least some of said output signals extracted by said extracting means.

DETAILED DESCRIPTION OF THE PREFERRED EMBODIMENTS

The present invention will now be described in detail referring to the preferred embodiments.

Figure 1:
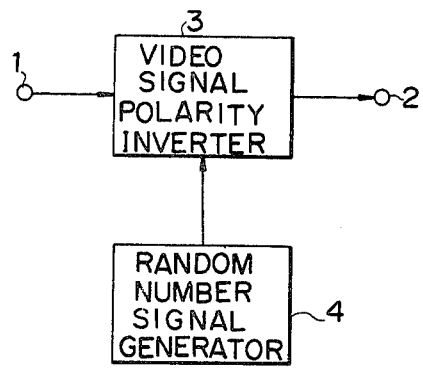
FIG. 1 shows a block diagram illustrating a conventional video signal ciphering system.
Figure 2:
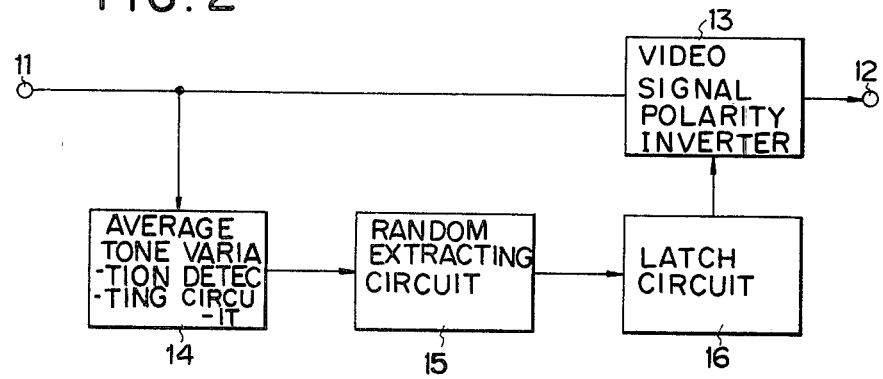
FIGS. 2-5 each shows a block diagram illustrating an embodiment according to the present invention.

FIG. 2 shows a block diagram illustrating an embodiment according to the present invention. The video cipher processing system as shown in FIG. 2 comprises an average tone variation detecting circuit 14 for detecting average tone variation of video signals, a random extracting circuit 15, a latch circuit 16 and a video signal polarity inverter 13.

Video signals applied to an input terminal 11 are processed in the average tone variation detecting circuit 14 to send to the random extracting circuit 15 output signals upon the occurrence of an average tone variation of the video signals. The random extracting circuit 15 is arranged to select some of these output signals to apply pulses to the latch circuit 16. That is, a certain percentage of the output signals are applied to the latch circuit 16 and each pulse generated in response thereto causes inversion of the latch circuit 16. Video signals applied to the input terminal 11 are supplied not only to the average tone variation detecting circuit 14 but also to the polarity inverter 13. The polarity inverter 13 is arranged to carry out inverting or non-inverting operation in response to control signals supplied from the latch circuit 16. That is, the polarity inverter 13 alternatively causes inversion or non-inversion of polarities of video signals to put them out to an output terminal 12.

Figure 3:
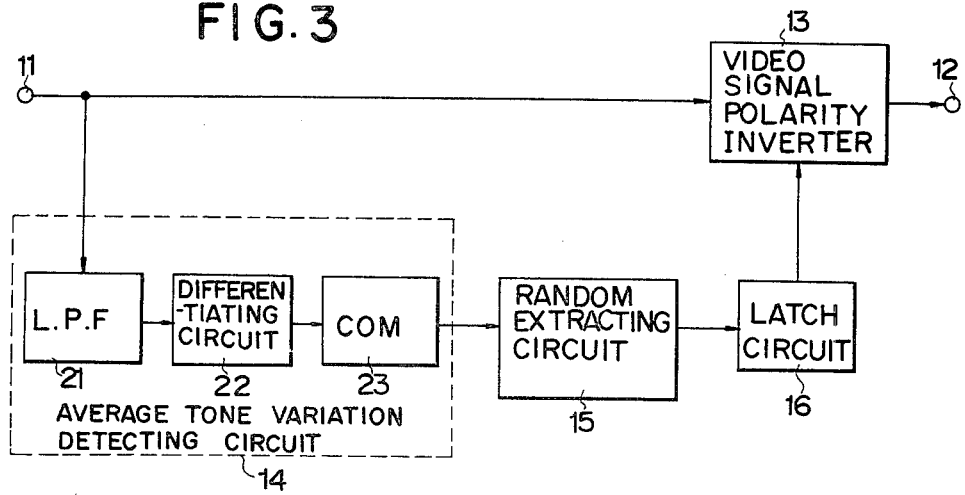

FIG. 3 shows a block diagram illustrating an example of the average tone variation detecting circuit 14 for detecting the average tone variation of the video signals. The circuit 14 as shown in FIG. 3 comprises a low pass filter 21, a differentiating circuit 22 and a comparator 23.

Video signals applied to the input terminal 11 are subjected to the elimination of high frequency components therein by the low pass filter 21, the low pass filter 21 thereby producing output signals proportional to the average tone of the video signals. The differentiating circuit 22 produces a differentiation pulse upon occurrence of average tone variation of the video signals. The comparator 23 is preferably of the window-type so as to apply signals to the random extracting circuit 15 only when the differentiating circuit 22 produces anode or cathode pulses whose absolute value exceed a predetermined value, respectively.

Figure 4:
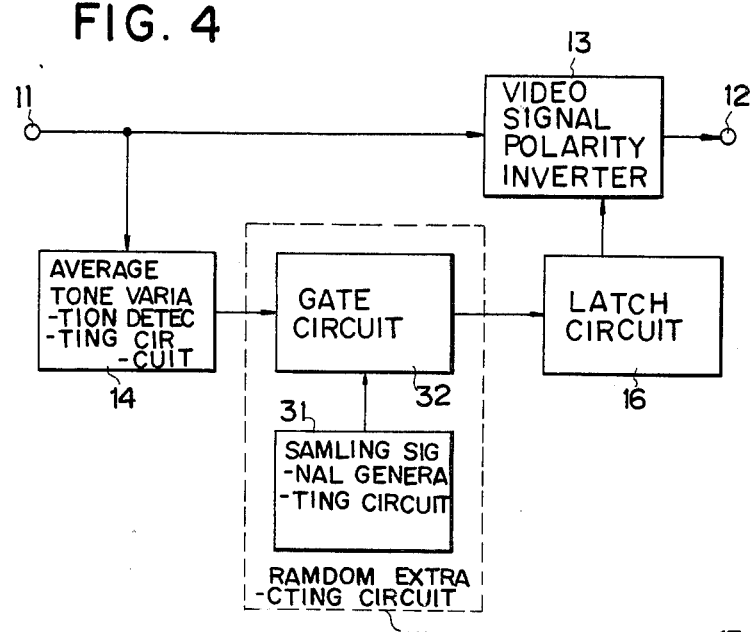

FIG. 4 shows a block diagram illustrating an example of the random extracting circuit 15. The random extracting circuit 15 as shown in FIG. 4 comprises a sampling signal generating circuit 31 and a gate circuit 32.

Signals generated from the average tone variation detecting circuit 14 are applied to the gate circuit 32. The gate circuit 32 selects some of the output signals from the average tone variation detecting circuit 14 in response to the control function of the sampling signals from the sampling signal generating circuit 31 and applies them to the latch circuit 16. Since the sampling signal generating circuit 31 and the average tone variation detecting circuit 14 are not synchronized with each other, selection of the output signals from the average tone variation detecting circuit 14 is carried out in a random manner.

Figure 5:
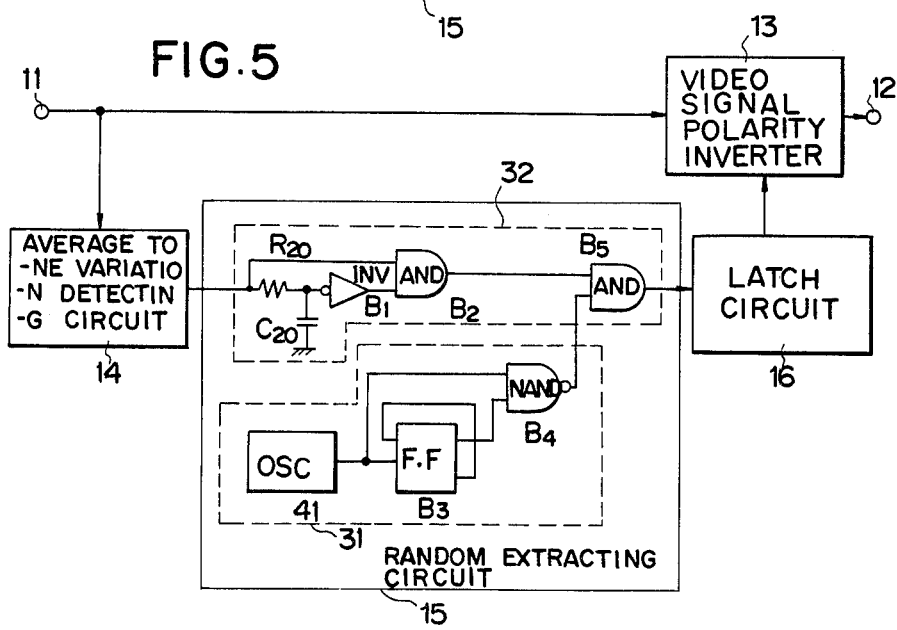

FIG. 5 shows an example of the circuits 31 and 32 which constitute the random extracting circuit 15. The sampling signal generating circuit 31 comprises an oscillator 41, a flip-flop circuit $B_3$ and a NAND gate $B_4$.

Figure 6:
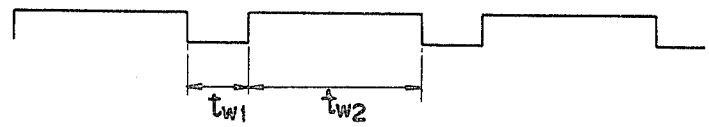
FIG. 6 shows an example of the wave form of a sampling signal.
Figure 7A:
FIGS. 7A-7D show wave forms showing the extracting operation of the random extracting circuit.
Figure 7B:
Figure 7C:
Figure 7D:

Sampling signals generated from the NAND gate $B_4$ are illustrated in FIG. 6. The proportion between the widths $t_{w1}$ and $t_{w2}$ as shown in FIG. 6 can be varied as desired by changing the duty cycle of the oscillating outputs from the oscillator 41.

The gate circuit 32 comprises a differentiating circuit including a resistor $R_{20}$ and a capacitor $C_{20}$, an inverter $B_1$, an AND gate $B_2$, and an AND gate $B_5$. Output signals from the average tone variation detecting circuit 14 are converted to pulses by the differentiating circuit and applied to the AND gate $B_5$. The AND gate $B_5$ is arranged to select some of the differentiation pulses at random in response to the control function of the sampling signals generated from the sampling signal generating circuit 31 and to supply these selected pulses to the latch circuit 16. In FIGS. 7A-7D there are shown examples of a signal 7A supplied from the average tone variation detecting circuit 14, differentiation pulses FIG. 7B generated by the differentiating circuit comprising the resistor $R_{20}$ and capacitor $C_{20}$, inverter $B_1$ and AND gate $B_2$, sampling signals FIG. 7C generated by the sampling signal generating circuit 31 and signals (FIG. 7D) supplied by the random extracting circuit 15 to the latch circuit 16. As aparent from FIGS. 7A-7D, pulses $P_1$ and $P_2$ among the differentiation pulses are extracted by the sampling signals of FIG. 7C and applied to the latch circuit 16 as the signals shown in FIG. 7D. Pulse $P_3$ is prevented by the sampling signals from appearing in the signals of FIG. 7D and accordingly will not be applied to the latch circuit 16.

The latch circuit 16 supplies the control signal input terminal of the polarity inverter 13 with signals for energizing or deenergizing it. That is, if the latch circuit 16 has at a given time received its last signal from the random extracting circuit 15 to supply the control signal input terminal of the inverter 13 with energizing signals to invert polarities of the video signals applied to the input terminal 11 to transmit them and the output terminal 12, the latch circuit 16, upon receiving the next signal from the random extracting circuit, applies a deenergizing signal to the control signal input terminal of the inverter 13 to allow it to transmit video signals applied to the input terminal 11 to the output terminal 12 without inverting them.

Figure 8:
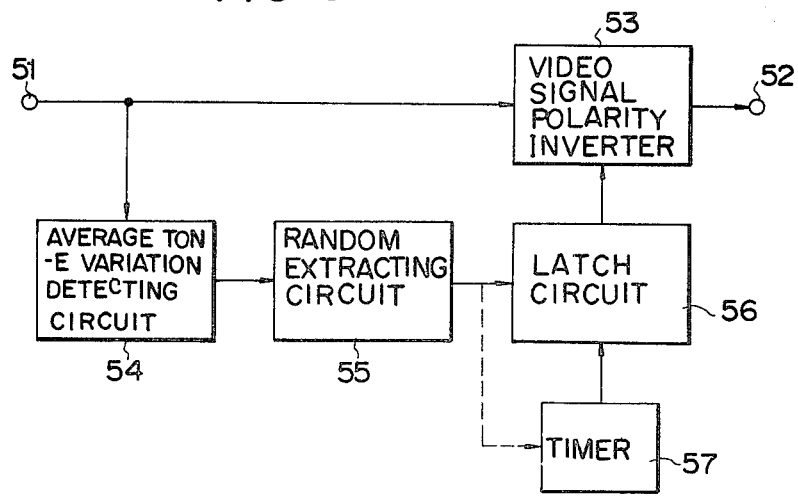
FIG. 8 shows a block diagram illustrating a further embodiment according to the present invention.

FIG. 8 illustrates another embodiment according to the present invention which comprises a timer 57 in addition to an average tone variation detecting circuit 54, a random extracting circuit 55, a latch circuit 56 and a video signal polarity inverter 53.

In the previously described cipher processing manner comprising the processes of detecting average tone variation, extracting at random some of the pulses as a result of the detection, and inverting polarities of video signals, there remains a possibility that the cipher cycle will be carried out only a very few times during video transmissions having few scene changes. The timer 57 is thereby adopted in this connection to produce an output signal if the average tone has not varied for a predetermined time so as to invert the condition of the latch circuit 56, thus controlling the ciphering operation of the video signals.

As apparent from the above description, according to the present invention, cipher treatment is carried out by inverting video signals only upon changing of scenes when the brightness of the screen varies and accordingly as the average tone of the video signals varies. Therefore, even if discrepancies arise between the original signals and the reproduced signals due to differences of characteristics of the parts used in the encoder and the decoder, subscribers are scarcely aware of flicker. Further, since the ciphering operation of the video signals is controlled by only some of the pulses, which are extracted at random among the pulses, as a result of the average tone variation detection, it is possible to keep a high secrecy of the ciphering operation, which might otherwise be disclosed in conventional systems for carrying out the cipher process by inverting video signal polarities every time upon average tone variation.

Thus, the present invention provides a video cipher processing system capable of reducing the influence of flicker while at the same time keeping the secrecy of the ciphering manner by utilizing a simple circuit.

I claim:

1. In a video cipher processing system for accepting video signals supplied to the input thereof and for providing a ciphered video signal at the output thereof, said cipher processing system including inverting means for controllably selectively inverting said video input signals provided to said processing systems responsively to control signals applied to said inverting means, said inverting means providing said controllably selectively inverted video signals to the output of said processing systems, and tone detecting means for producing signals responsive to changes in the average tone of said video input signals provided to said processing system, said signals produced by said tone detecting means being used to selectively actuate said inverting means to an inverting or a non-inverting condition, the improvement comprising:

extracting means for selecting at random some of said signals produced by said tone detecting means; and control means responsive to said random selected signals for actuating said inverting means responsively thereto.

2. The system as claimed in claim 1, wherein said extracting means comprises a sampling signal generating circuit and a gate circuit, said gate circuit being supplied with sampling signals from said sampling signal generating circuit and said outputs from said average tone variation detecting means.

3. The system as claimed in claim 2, wherein said sampling signal generating circuit comprises an oscillator, a flip-flop circuit to which outputs from said oscillator are applied and a NAND gate to which outputs from said oscillator as well as flip-flop circuit are applied.

4. The system as claimed in claim 3, wherein said gate circuit comprises a differentiating circuit and an AND gate, said differentiating circuit being supplied with outputs from said average tone variation detecting means, one of input terminals of said AND gate being supplied with outputs from said differentiating circuit and the other input terminal of said AND gate being supplied with outputs from said NAND gate.

* * * * *